(12) United States Patent
Powell

(10) Patent No.: US 9,926,083 B2
(45) Date of Patent: Mar. 27, 2018

(54) VALVE FOR AN AIRCRAFT

(71) Applicant: Eaton Limited, Titchfield Hampshire (GB)

(72) Inventor: Melvyn Powell, Hampshire (GB)

(73) Assignee: EATON LIMITED, Titchfield Hampshire (GB)

( * ) Notice: Subject to any disclaimer, the term of this patent is extended or adjusted under 35 U.S.C. 154(b) by 0 days.

(21) Appl. No.: 14/417,828

(22) PCT Filed: Jul. 12, 2013

(86) PCT No.: PCT/EP2013/064798
§ 371 (c)(1),
(2) Date: Jan. 28, 2015

(87) PCT Pub. No.: WO2014/019833
PCT Pub. Date: Feb. 6, 2014

(65) Prior Publication Data
US 2015/0210403 A1 Jul. 30, 2015

(30) Foreign Application Priority Data

Jul. 31, 2012 (GB) .................................. 1213626.3

(51) Int. Cl.
*B64D 37/12* (2006.01)
*F16L 29/02* (2006.01)
(Continued)

(52) U.S. Cl.
CPC ........... *B64D 37/12* (2013.01); *B64D 37/005* (2013.01); *F16K 1/465* (2013.01); *F16K 27/02* (2013.01);
(Continued)

(58) Field of Classification Search
CPC ...... B64D 37/12; B64D 37/005; F16J 15/187; F16J 15/3224; F16L 29/02; F16L 37/40;
(Continued)

(56) References Cited

U.S. PATENT DOCUMENTS 1,345,571 A * 7/1920 Yates ...................... F16L 29/04
137/614
1,547,483 A * 7/1925 Woodruff ................ F16L 27/04
285/265

(Continued)

FOREIGN PATENT DOCUMENTS

DE 1195606 B 6/1965

*Primary Examiner* — Mary McManmon
*Assistant Examiner* — David Colon Morales
(74) *Attorney, Agent, or Firm* — Leydig, Voit & Mayer, Ltd.

(57) ABSTRACT

A valve for connecting an external tank to an aircraft has a valve body; and a seal assembly arranged, in use, to resiliently engage a seal surface on an aircraft. The seal assembly has a telescopic seal member extending from a proximal end within the valve body to a distal end. The telescopic seal member is constrained within the valve body so as to maintain axial alignment of the telescopic seal member and the valve body. The seal assembly may also have a seal carrier at the distal end of the telescopic seal member. The seal carrier may be pivotable relative to the telescopic seal member for alignment, in use, with the aircraft seal surface.

11 Claims, 4 Drawing Sheets

(51) Int. Cl.
  *F16L 27/06* (2006.01)
  *B64D 37/00* (2006.01)
  *F16L 1/00* (2006.01)
  *F16K 1/46* (2006.01)
  *F16K 27/02* (2006.01)
  *F16J 15/18* (2006.01)
  *F16J 15/3224* (2016.01)

(52) U.S. Cl.
  CPC ............... *F16L 1/00* (2013.01); *F16L 27/06* (2013.01); *F16L 29/02* (2013.01); *F16J 15/187* (2013.01); *F16J 15/3224* (2013.01)

(58) Field of Classification Search
  CPC ......... F16L 27/00; F16L 27/02; F16L 27/026; F16L 27/04; F16L 27/044; F16L 27/06; F16L 27/073
  USPC ......... 251/149.1, 149.6, 149.7, 149.8, 149.9, 251/144, 145, 148, 143, 153; 285/267, 285/268–271, 375
  See application file for complete search history.

(56) References Cited

U.S. PATENT DOCUMENTS

| | | | | |
|---|---|---|---|---|
| 1,651,522 A | * | 12/1927 | Gold | F16L 27/073 285/267 |
| 1,681,626 A | * | 8/1928 | Russell | F16L 27/073 285/100 |
| 1,714,142 A | * | 5/1929 | Schmitt | F16J 15/12 277/613 |
| 2,071,750 A | * | 2/1937 | Kusebauch | F16L 27/06 285/269 |
| 2,362,880 A | * | 11/1944 | Campbell | F16N 21/04 184/105.1 |
| 2,427,456 A | * | 9/1947 | Hoy | F16L 27/06 285/267 |
| 2,582,609 A | * | 1/1952 | Steele | B64D 39/04 244/135 A |
| 2,686,529 A | * | 8/1954 | Lanninger | F16L 37/113 137/322 |
| 2,731,278 A | * | 1/1956 | Soderstrom | B64D 37/12 137/899.2 |
| 3,089,714 A | * | 5/1963 | Croy | F16F 3/0873 285/145.5 |
| 3,107,107 A | * | 10/1963 | Guarnaschelli | F16L 27/082 277/379 |
| 3,129,718 A | | 4/1964 | Schlensker | |
| 3,227,475 A | * | 1/1966 | Sinkinson | B64D 13/00 244/135 R |
| 3,319,979 A | * | 5/1967 | Herold | F16L 37/002 285/101 |
| 3,664,634 A | * | 5/1972 | Guertin | F16L 37/18 137/614.06 |
| 3,670,770 A | * | 6/1972 | Nelson | F16L 37/26 137/614.02 |
| 3,938,564 A | * | 2/1976 | Jones | B60K 15/04 137/614.03 |
| 4,296,952 A | * | 10/1981 | McCracken | F16L 27/0828 285/276 |
| 4,306,693 A | | 12/1981 | Cooper | |
| 4,378,945 A | * | 4/1983 | Trautman | B60K 13/02 180/309 |
| 4,647,084 A | * | 3/1987 | Hagin | F16L 27/053 285/184 |
| 4,790,350 A | | 12/1988 | Arnold | |
| 4,856,827 A | * | 8/1989 | Delamare | B63B 35/4406 166/355 |
| 4,892,171 A | * | 1/1990 | Scheindel | F16N 21/04 184/105.1 |
| 5,483,991 A | * | 1/1996 | D'Agostino | F16K 1/34 137/514 |
| 5,657,963 A | * | 8/1997 | Hinchliffe | A61B 17/3462 251/149.1 |
| 6,047,994 A | * | 4/2000 | Augustinus | B67D 1/0838 285/136.1 |
| 2011/0129292 A1 | * | 6/2011 | Chen | F16J 15/061 403/72 |

* cited by examiner

VALVE FOR AN AIRCRAFT

CROSS-REFERENCE TO RELATED APPLICATIONS

This application is a U.S. National Stage application under 35 U.S.C. §371 of International Application No. PCT/EP2013/064798, filed on Jul. 12, 2013, and claims benefit to British Patent Application No. 1213626.3, filed on Jul. 31, 2012. The International Application was published in English on Feb. 6, 2014, as WO 2014/019833 A2 under PCT Article 21(2).

FIELD

The present invention relates to a valve for connecting an external tank to an aircraft.

BACKGROUND

It is known to provide auxiliary fuel tanks which may be externally carried on an aircraft (sometimes referred to as "Drop Tanks"). Exterior tanks are typically connected to an aircraft fuel system by means of a two-part valve which comprises an aircraft valve attached to the aircraft and a complimentary valve on the tank. The valve must provide a connection between the external tank and the aircraft system and provide a leak-proof seal between the tank and the aircraft.

A fuel tank valve according to an existing design is shown in FIG. 1 (with a cross sectional profile shown in FIG. 1b). The valve 10 comprises a valve body 12 having a generally cylindrical profile so as to define a central bore through which fluid may flow. A telescopic seal member 14 is received within the valve body and extends the central bore beyond the external surface 24 of the valve body 12. The telescopic seal member 14 is biased towards an extended position by a spring 18. In use, the spring is intended to be in a compressed state, as the telescopic seal member 14 is at least partial pressed back into the valve body 12. Thus, the spring provides a sealing force at the seal surfaces. The proximal (i.e. internal) end of the telescopic seal member 14 is provided with a seat 22 on its external surface for receiving an O-ring to seal against the internal surface of the valve body 12. The distal (i.e. external) end of the telescopic seal member 14 is provided with a resilient portion in the form of a compressible elastomer seal 20 which, in use, is intended to form a sealing engagement with a planar seal surface of the aircraft. The telescopic member 14 is arranged such that it has a degree of lateral freedom within the valve body. Specifically, a clearance gap is maintained between the telescopic seal member 14 and both the valve body 12 (for example between the seal seat 22 and the internal surface of the valve body 12) and the hole 26 in the outer surface 24 of the valve body. Additionally, the telescopic seal member is provided with a tapered external profile which converges slightly towards its distal end. The telescopic seal member may for example be arranged such that it may tilt its longitudinal axis by up to 5 degrees. This freedom is intended to allow the seal to both align with the aircraft seal surface when fitted to the aircraft and to accommodate any relative dynamic movement between the tank and aircraft during maneuvers on the ground or in flight.

SUMMARY

An aspect of the invention provides a valve for connecting an external tank to an aircraft, the valve comprising: a valve body; and a seal assembly configured, in use, to resiliently engage a seal surface on an aircraft, the seal assembly including: a telescopic seal member extending from a proximal end within the valve body to a distal end, the telescopic seal member being constrained within the valve body so as to maintain axial alignment of the telescopic seal member and the valve body; and a seal carrier provided at the distal end of the telescopic seal member, the seal carrier being pivotable relative to the telescopic seal member for alignment, in use, with the aircraft seal surface.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1b is a schematic three dimensional cross sectional view of the valve of FIG. 1a;

FIG. 2b is a schematic three dimensional cross sectional view of the valve of FIG. 2a;

DETAILED DESCRIPTION

Figure 1A:
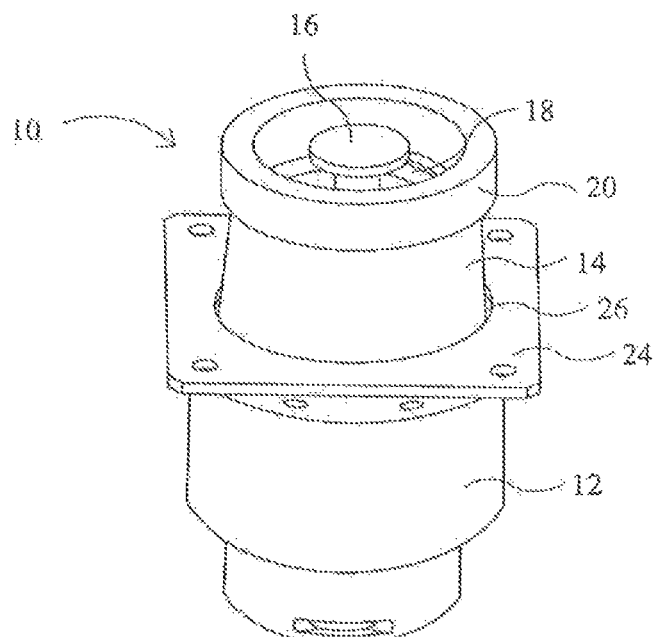
FIG. 1a is a schematic three dimensional view of an existing valve for an external fuel tank.
Figure 1B:
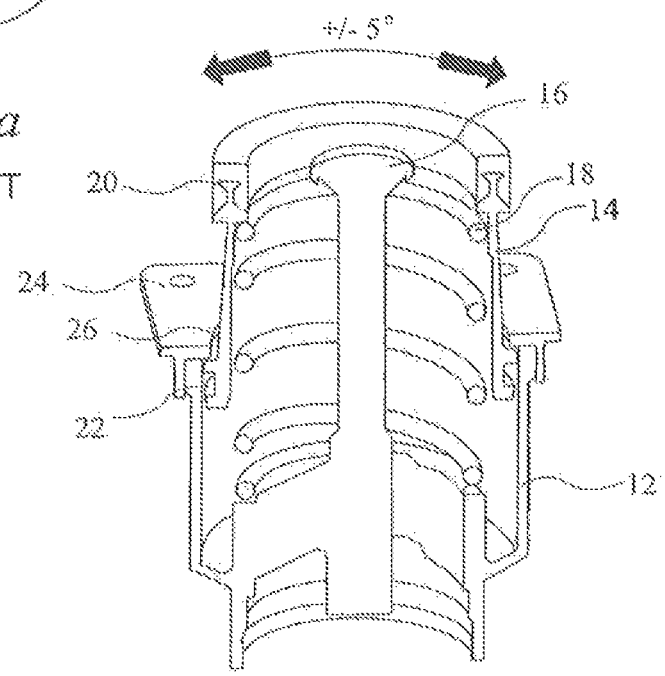

It has been found that a cause of leakage in existing designs is a result of the seal surface losing full contact with the aircraft seal surface. In particular, in the case of lateral movement between the aircraft and the tank (which may for example be the result of rapid maneuvering) the high friction between the elastomer seal 20 and the seal surface may partially prevent the elastomer seal from sliding across the surface resulting in angling of the seal. Embodiments of the invention seek to provide a valve arrangement with an improved leak resistance and, in particular, an arrangement with an increased leak resistance during aircraft maneuvers.

An aspect of the invention provides a valve for connecting an external tank to an aircraft, particularly, but not exclusively, a valve for connecting to an aircraft fuel system.

Accordingly, an aspect of the present invention provides a valve for connecting an external tank to an aircraft, the valve comprising:
 a valve body; and
 a seal assembly arranged, in use, to resiliently engage a seal surface of an aircraft, the seal assembly comprising:
  a telescopic seal member extending from a proximal end within the valve body to a distal end, the telescopic seal member being constrained within the valve body so as to maintain axial alignment of the telescopic seal member and the valve body; and a seal carrier provided at the distal end of the telescopic seal member, the seal carrier being pivotable relative to the telescopic seal member for alignment, in use, with the aircraft seal surface.

Advantageously, the provision of a pivotable seal carrier ensures that the seal assembly of the valve is able to accommodate relative angular movement between the tank and the aircraft seal surface at a location which is only a short distance from the valve mating surfaces. This acts to discourage the seal from tilting on the aircraft seal surface, which may otherwise result in partial seal opening.

The distal end of the telescopic seal member and the seal carrier may be provided with complimentary bearing surfaces which enable the seal carrier to pivot relative to the telescopic seal member and provide a sealing surface between the seal carrier and the telescopic seal member. Preferably, the distal end of the telescopic seal member comprises a generally convex bearing surface and the seal carrier comprises a complimentary concave bearing surface. Alternatively, it will be appreciated that the surfaces may be reverse such that the distal end of the telescopic seal member comprises a generally concave bearing surface and the seal carrier comprises a complimentary convex bearing surface.

The seal carrier may have a single degree of freedom (for example by providing a radial bearing surface) which would typically be aligned with the expected plane of the flexure of the tank in use. Preferably, a spherical bearing is provided between the seal carrier and the telescopic seal member (such that the seal member may align to any angular displacement of the tank).

Advantageously, a spherical bearing may be arranged such that the seal carrier may rotate about its longitudinal axis and may thereby enable the seal carrier to accommodate rotational movement between the tank and the aircraft. This provides a further advantage over the existing arrangement in which both the seal surface of the elastomer seal and the O-ring between the valve body and telescopic seal member provide friction forces which act to resist rotation movement of the seal.

It will be appreciated that a spherical bearing requires at least one of the complimentary bearing surfaces to have a substantially spherical surface profile. The other of the complimentary bearing surfaces may be substantially spherical, substantially conical (for example frustoconical) or simply a circumferential edge.

The valve body may comprise an external surface which, in use, opposes a surface of an aircraft and wherein the surface is provided with a hole through which the telescopic seal member protrudes, said hole being dimensioned and sized to closely match the external profile of the telescopic seal member. Thus the hole may be arranged to enable axial movement and/or rotation of the telescopic seal member about its longitudinal axis but will limit tilting of the telescopic seal member axis.

The valve body may comprise a generally cylindrical body and the telescopic seal member may comprises a generally cylindrical body having an external diameter which is less that the internal diameter of the valve body so as to be received within the valve body. A seal may typically be provided between the internal surface of the valve body and the external surface of the telescopic seal member. For example the external surface of the telescopic seal may be provided with a valve seat which retains an O-ring in sealing engagement with the valve body. The valve seat may be dimensioned and sized to closely match the internal diameter of the valve body.

A biasing means, for example a spring, is typically disposed between the valve body and the telescopic seal member and arranged to bias the telescopic seal member toward an extended position.

The seal carrier may comprise an abutment surface for engaging, in use, a seal surface on an aircraft. The abutment surface may comprise a seal seat. The abutment surface is substantially planar so as to allow the seal carrier to slide across the aircraft seal surface in the event of relative lateral displacement between the tank and the aircraft. The abutment surface may be provided with an O-ring which may be partially recessed into the abutment surface.

The seal carrier may be generally annular. The seal carrier may be arranged to engage the distal end of the telescopic seal member. The seal carrier may resiliently engage the telescopic seal member, for example the seal carrier may be mounted on the telescopic seal member by a snap fit arrangement. The seal carrier and telescopic seal member may be provided with mutual engagement features to retain the seal carrier thereon, for example the mutual engagement features may comprise a complimentary tab and recess. The mutual engagement features may comprise a circumferential recess on the inner surface of the seal carrier and an outwardly extending tab on the outer surface of the distal end of the telescopic seal member arranged to engage the recess.

A mechanical stop may be provided to limit the range of motion of the seal carrier with respect to the telescopic seal member. The mutual engagement features may be further configured to provide a stop to limit the range of motion of the seal carrier.

The valve body and seal assembly may define a central bore (through which fluid flows in use) which may generally extend along the longitudinal axis of the valve. A valve engagement member may extend through the central bore, and shaped and configured to engage an opening mechanism of a valve on an aircraft.

The seal carrier may be adapted for alignment, in use, with a planar aircraft seal surface or a non-planar aircraft seal surface.

According to a second aspect of the invention there is provided an external tank for an aircraft comprising a valve in accordance with embodiments of the invention. The external tank may be an aircraft fuel tank. The external tank may comprise a plurality of valves in accordance with embodiments of the invention.

Whilst the invention has been described above, it extends to any inventive combination of features set out above or in the following description or drawings.

Figure 2A:
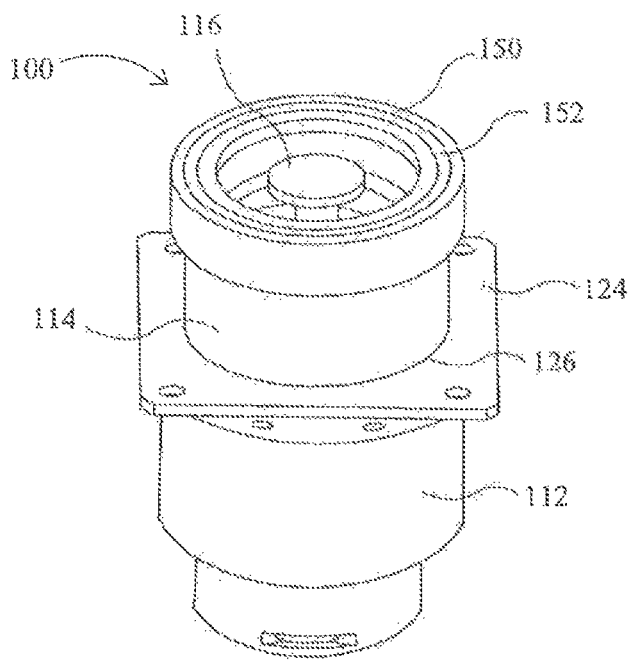
FIG. 2a is a schematic three dimensional view of a valve for an external fuel tank according to an embodiment of the invention.

A valve 100 in accordance with an embodiment of the invention is shown in FIG. 2. The valve comprises a valve body 112 is formed from aluminium and has a substantially cylindrical body with a cylindrical internal surface which is arranged to receive a telescopic seal member 114. A central bore for the flow of fluid extends along the longitudinal axis of the valve body 112 and along the longitudinal axis of the telescopic seal member 114. The valve body 112 is provided with an outer annular channel 113, which surrounds the central bore, for accommodating the telescopic seal member 114 such that the diameter of the central bore may remain substantially constant throughout the valve.

The telescopic seal member 114 comprises a cylindrical aluminium pipe and is arranged to extend from the body and, in use, to engage a seal surface on an aircraft in a sealing arrangement. A steel spring 118 is provided between the telescopic seal member 114 and the valve 112 so as to bias the telescopic seal member out of the valve body 112.

Figure 2B:
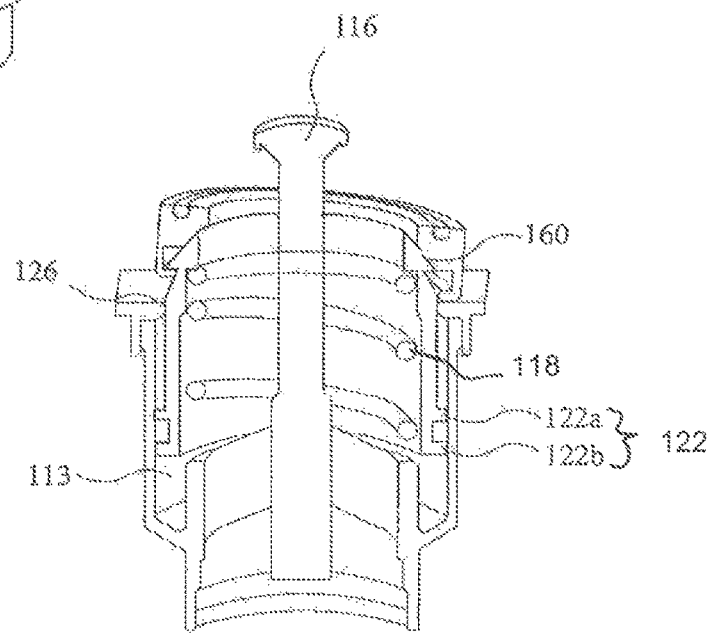

The valve 100 further comprises a valve engagement member 116 which extends through the central bore of both the telescopic seal member and the valve body to engage a valve member on a complimentary valve part mounted on an aircraft. As best seen in FIG. 2b, with the spring 118 is compressed and the telescopic seal member 114 partially retracted into the valve body 112 the engagement member 116 extends beyond the seal surface of the valve 100.

In accordance with the invention, a seal carrier 150 is disposed upon the distal end of the telescopic seal member 114. A spherical bearing 160 is provided between the seal carrier 150 and the telescopic seal member 114 such that the seal carrier 125 is pivotable relative to the telescopic seal member 114 to enable alignment with a seal surface of an aircraft. The arrangement of the seal carrier is explained in further detail below.

The telescopic seal member 114 is arranged within the valve 100 such that it is held in axial alignment with the valve body 112. In particular, relative rotation of the axis of the telescopic seal member 114 is prevented by the provision of a hole 126 in the external surface 124 of the valve body 112 which is dimensioned and sized to closely match the external diameter of the telescopic seal member 114. Typically, the hole 126 and the telescopic seal member 114 could be arranged with a clearance fit such that the telescopic seal member can freely slide in an axial direction or rotate about its longitudinal axes but would be maintained in alignment. Additionally, a seal arrangement 122 is provided at the proximal (internal) end of the telescopic member 114 and is also configured to help maintain the axial alignment of the telescopic seal member. The seal is provided between the external surface of the telescopic seal member 114 and the internal surface of the valve body 112 and comprises a seal seat 122 for receiving an O-ring. The seal seat is formed by a pair of radially extending circumferential ridges 122A and 122B on the external surface of the telescopic seal member 114. Each of the ridges 122A and 122B are sized so as to maintain the desired spacing between the telescopic seal member 114 and the valve body 112. Typically, a clearance fit may be provided between the seal seat 122 and the valve body 112 thereby maintaining the axial alignment of the telescopic seal member and the valve body.

Figure 3A:
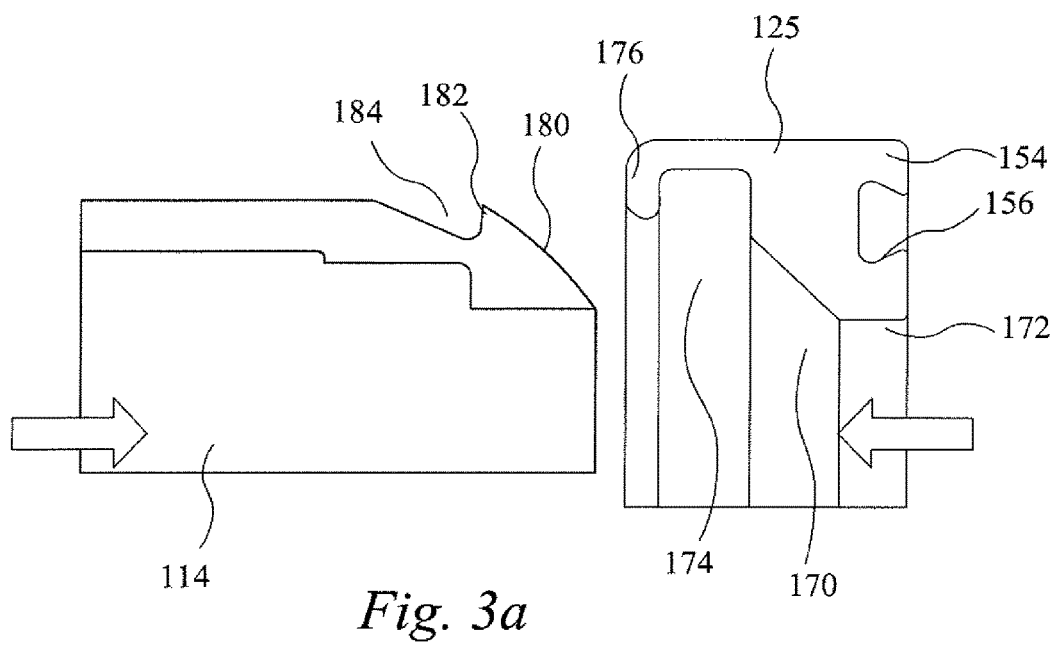
FIGS. 3a and 3b is schematic cross sectional detail of the valve of FIG. 2.
Figure 3B:
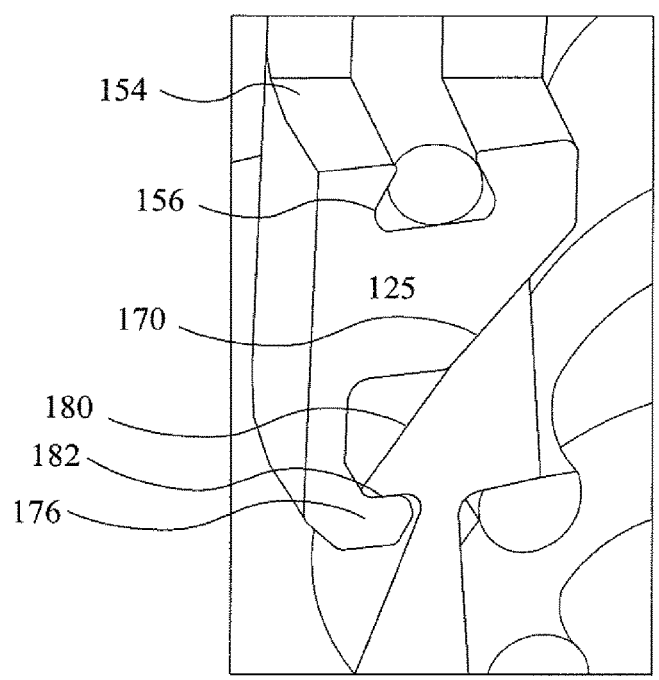

As best seen in FIGS. 3a and 3b, the seal carrier 150 and the external distal end of the telescopic seal member 114 are provided with complimentary profiles which allow the seal carrier to be retained on the telescopic seal member 114 while also allowing rotation of the seal carrier with respect to the telescopic seal member 114. The seal carrier 150 is typically formed from a plastic material, for example nylon, such that it may resiliently engage the telescopic seal member 114. The seal carrier is, therefore, a "snap-fit" arrangement which undergoes plastic deformation in order to pass over a mutual engagement feature on the telescopic seal member 114 and to be retained thereon. The seal carrier 150 has a generally annular profile and is provided with a substantially planar abutment surface 154 which is arranged to engage a seal surface of an aircraft in use. The abutment surface 154 typically comprises a recessed seal seat 156 for receiving and captivating an O-ring 152. The seal seat may be provided with a profile which converges as the recess extends towards the abutment surface 154 such that an O-ring may be inserted into the seal seat by plastic deformation before being retained therein (as shown in FIG. 3b). The abutment surface 154 forms the outer boundary of a mouth 172 which is connected to the central bore of the valve 100. Adjacent to the mouth 172 the inner surface of the seal carrier 150 is provided with a convex surface in the form of a frustoconical bearing surface 170. The bearing surface 170 terminates at an outwardly extending circumferential recess 174 which is partially closed by an inwardly radially projecting circumferential wall 176 which forms the proximal end of the seal carrier 150.

The distal end of the telescopic seal member 114 is provided with a convex surface in the form of a spherical bearing surface 180 which is arranged to have a complimentary profile to the conical bearing surface 170 of the seal carrier 150. The spherical bearing surface 180 extends a short distance from the tip of the telescopic seal member 114 and terminates at an inwardly extending circumferential recess 184. The transition between the spherical bearing surface 180 and the external circumferential recess 184 forms a tab 182 which comprises a substantially radially extending wall. The recess 184 and tab 182 of the telescopic seal member have a complimentary profile to the wall 176 and recess 174 of the seal carrier 150 so as to provide mutual engagement features.

Accordingly, the seal carrier 150 may be installed upon the telescopic seal member 114 (as shown in FIG. 3b) by plastic deformation as the inwardly projecting wall 176 of the seal carrier 150 deflects outwardly as it slides across the spherical bearing surface 180 of the telescopic seal member 180 before returning to its non-deformed position within the recess 184. The tab 182 and wall 176 prevent removal of the seal carrier 150 and also act to provide a physical stop which limits the extent to which the seal carrier 150 is able to rotate with respect to the telescopic seal member 114 (this may be seen on the left hand side of the seal carrier 150 in FIG. 2b which has reached the limit of its range of motion). While the cooperating features of the seal carrier 150 and the telescopic seal member 114 are typically circumferentially continuous, it will be appreciated that they could be formed from a plurality of sections, for example the tab 182 could be formed of a number of discrete tab sections spaced around the periphery of the telescopic seal member 114.

In use, as best seen in FIG. 2b, the valve is mounted to an aircraft such that the abutment surface 154 of the seal carrier 150 engages a seal surface of the aircraft. The aircraft seal surface is substantially planar and surrounds a spring loaded valve which is biased towards a normally closed position. As the external tank is positioned upon the aircraft the first contact between the valve 100 and the aircraft is between the seal surface of the aircraft and the seal carrier 150 which may pivot in any direction relative to the axis of the valve 100 to align with the aircraft seal surface. As the tank is moved further into position the valve surfaces are compressed against each other to provide a good sealing engagement and the spring 118 is compressed as the telescopic seal member 114 is partially retracted into the valve body 112 (for example to the position shown in FIG. 2b). It will be appreciated that the extent to which the telescopic seal member is retracted may depend upon the particular mounting that the external tank is being used for. As the telescopic seal member 114 retracts the valve engagement member 116 begins to protrude beyond the plane of the abutment surface 154 of the seal carrier 150 (which is the plane of aircraft seal surface). Thus, the valve engagement member 114 may engage the spring loaded valve on the aircraft and move it to an open position such that the valve of the fuel tank and the aircraft valve are placed in fluid communication. In the event of movement between the tank and aircraft (for example during aircraft maneuvers) the seal is able retain sealing engagement whilst accommodating the movement. Specifically: axial movement is accommodated by movement between the telescopic seal member and the valve body; rotational or tilting movement is accommodated by the movement of the spherical bearing between the seal carrier and the telescopic member; and lateral movement is accommodated by sliding between the parallel aligned sealing surfaces of the seal carrier and the aircraft seal surface.

Figure 4:
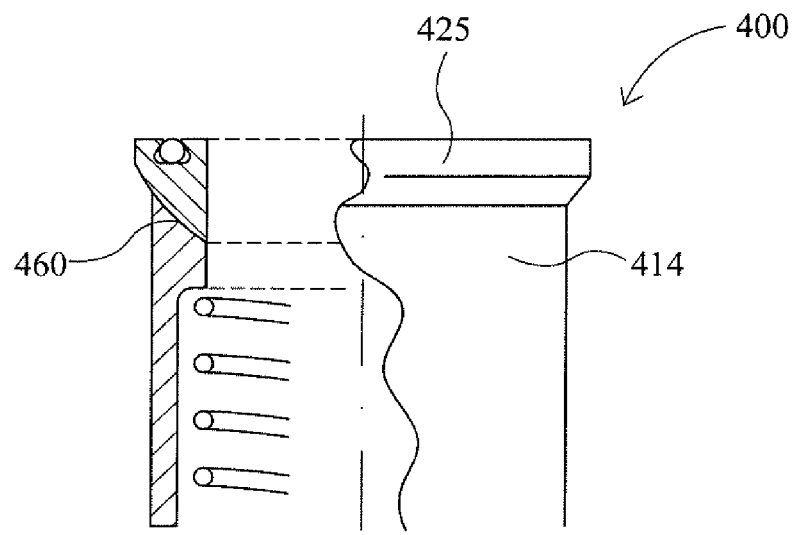
FIG. 4 is a schematic partial cross section of an alternate seal assembly in accordance with an embodiment of the invention.

FIG. 4 shows an alternate seal assembly 400 which may be used in alternate embodiments. The seal assembly 400 is equivalent to that of the earlier embodiment but uses a reverse orientated spherical bearing arrangement 460 between the seal carrier 450 and telescopic seal member 414. Accordingly, the telescopic seal member 460 is provided with a concave bearing surface and the seal carrier 450 is provided with a convex bearing surface. The convex surface would typically be spherical and the concave surface frustoconical.

Figure 5:
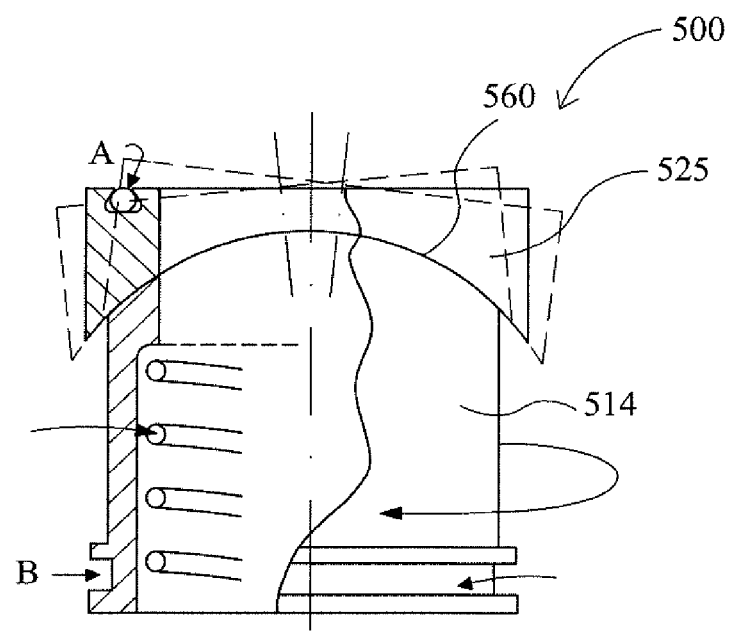
FIG. 5 is a schematic partial cross section of a further alternate seal assembly in accordance with another embodiment of the invention.

FIG. 5 shows an alternate seal assembly 500 which may be used in further embodiments. The seal assembly 500 in this embodiment is provided with a radial bearing surface 560 between the between the seal carrier 550 and telescopic seal member 514. This arrangement limits the movement of the seal carrier to pivoting in a single plane. Rotational movement between in this arrangement is also limited compared to embodiments using spherical bearings since rotation movement is accommodated by rotation of the telescopic seal member 514 relative to the valve body. This rotational movement must overcome the frictional forces of the seals (as indicated by locations A and B on FIG. 5) and rotational resistance of the spring 518.

It may be noted that the spherical bearing of the preferred embodiment consists of the combination of a spherical and a frustoconical bearing surface. This provides a line contact between the bearing surfaces and reduces the tolerances required in manufacturing of the surfaces (with the key requirement being only that the mating surfaces have a good surface quality). A frustoconical bearing surface also provides a more wear resistant bearing than a circumferential edge contact arrangement.

It will be appreciated that the present invention is intended to be compatible with existing aircraft valve parts without requiring modification. It will also be appreciated that the valve body according to embodiments of the invention may be substantially identical to the valve body of existing designs. Accordingly, a seal assembly according to embodiments of the invention may be retrofitted to an existing valve body to provide a valve in accordance with the invention.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A device for connecting an external tank to an aircraft, the aircraft including a seal surface with an opening and a valve with an opening mechanism, the device comprising:
   a valve body; and
   a seal assembly configured, in use, to resiliently engage the seal surface on the aircraft, the seal assembly including:
   a telescopic seal member extending from a proximal end within the valve body to a distal end, the telescopic seal member being constrained within the valve body so as to maintain axial alignment of the telescopic seal member and the valve body; and
   a seal carrier provided at the distal end of the telescopic seal member, the seal carrier being pivotable relative to the telescopic seal member for alignment, in use, with the aircraft seal surface;
   wherein the seal carrier is generally annular and configured to engage the distal end of the telescopic seal member, and
   wherein the seal carrier and telescopic seal member include mutual engagement features configured to retain the seal carrier, the mutual engagement features including a circumferential recess on an inner surface of the seal carrier and an outwardly extending tab on an outer surface of the distal end of the telescopic seal member, and wherein the outwardly extending tab is configured to engage the recess.

2. The device of claim 1, wherein the distal end of the telescopic seal member includes a generally convex bearing surface, and
   wherein the seal carrier includes a complimentary concave bearing surface.

3. The device of claim 1, further comprising:
   a spherical bearing between the seal carrier and the telescopic seal member.

4. The device of claim 1,
   wherein the valve body further includes an external surface, and
   wherein the external surface includes a hole through which the telescopic seal member protrudes,
   wherein the hole is dimensioned and sized to closely match the external profile of the telescopic seal member.

5. The device of claim 1,
   wherein the valve body is a generally cylindrical body, and
   wherein the telescopic seal member is a generally cylindrical body having an external diameter which is less that the internal diameter of the valve body, such that the telescopic seal member is configured to be received within the valve body.

6. The device of claim 5, further comprising:
   a seal,
   wherein the seal is provided between an internal surface of the valve body and an external surface of the telescopic seal member.

7. The device of claim 1, further comprising:
a biasing unit,
wherein the biasing unit is disposed between the valve body and the telescopic seal member, and
wherein the biasing unit is configured to bias the telescopic seal member toward an extended position.

8. The device of claim 1,
wherein the seal carrier further includes an abutment surface configured to engage, in use, the seal surface on the aircraft, and
wherein the abutment surface includes a seal seat.

9. The device of claim 1, wherein the mutual engagement features are further configured to provide a stop to limit a range of motion of the seal carrier.

10. The device of claim 1, further comprising:
a valve engagement member extending through a central bore defined by the valve body and seal assembly,
the valve engagement member being shaped and configured to engage the opening mechanism.

11. The device of claim 1, wherein the seal carrier is configured to resiliently engage the distal end of the telescopic seal member.

* * * * *